(12) United States Patent
Kono et al.

(10) Patent No.: US 9,043,141 B2
(45) Date of Patent: May 26, 2015

(54) NAVIGATION SYSTEM AND NAVIGATION METHOD OF ROUTE PLANNING USING VARIATIONS OF MECHANICAL ENERGY

(71) Applicant: Clarion Co., Ltd., Bunkyo-ku, Tokyo (JP)

(72) Inventors: Toshiaki Kono, Ashford (GB); Takumi Fushiki, Hitachi (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/466,241

(22) Filed: Aug. 22, 2014

(65) Prior Publication Data

US 2014/0365105 A1 Dec. 11, 2014

Related U.S. Application Data

(63) Continuation-in-part of application No. 12/608,340, filed on Oct. 29, 2009, now abandoned.

(30) Foreign Application Priority Data

Oct. 31, 2008 (JP) .................................. 2008-281968

(51) Int. Cl.
*G05D 1/00* (2006.01)
*G05D 3/00* (2006.01)
*G06F 7/00* (2006.01)
*G06F 17/00* (2006.01)
(Continued)

(52) U.S. Cl.
CPC ............ *G01C 21/3469* (2013.01); *G01C 21/32* (2013.01)

(58) Field of Classification Search
USPC ............................ 701/200, 201, 213; 340/439
See application file for complete search history.

(56) References Cited

U.S. PATENT DOCUMENTS 5,578,748 A * 11/1996 Brehob et al. ............. 73/114.53
5,742,922 A * 4/1998 Kim ............................. 701/423
(Continued)

FOREIGN PATENT DOCUMENTS

JP          2-278116 A    11/1990
JP          9-93717 A      4/1997
(Continued)

OTHER PUBLICATIONS

The Extended European Search Report dated Feb. 17, 2010 (Four (4) pages).

*Primary Examiner* — Tien Dinh
*Assistant Examiner* — Michael A Fabula
(74) *Attorney, Agent, or Firm* — Crowell & Moring LLP

(57) ABSTRACT

A navigation system having a central device which uses a link shape compression unit to compress information of altitude changes of a road link obtained from a three-dimensional road map, and calculates a geometry parameter based on variation of energy of a vehicle travelling on the road link. An on-board terminal device estimates the vehicle's average travelling pattern by using a travel-pattern-estimation unit based on the geometry parameter calculated by the central device, a link-travelling time estimated from statistically-stored traffic information, and a link length. The on-board terminal device further calculates fuel consumption of the vehicle travelling on each road link based on the estimated travelling pattern and parameters of the vehicle by using a fuel-consumption calculation unit, and then, searches a fuel-efficient route by using the fuel consumption as a link cost. The on-board terminal device has a vehicle-type selector for selecting a type of the vehicle.

6 Claims, 14 Drawing Sheets

(51) Int. Cl.
*G01C 21/34* (2006.01)
*G01C 21/32* (2006.01)

(56) References Cited

U.S. PATENT DOCUMENTS

| | | | |
|---|---|---|---|
| 5,913,917 A * | 6/1999 | Murphy | 701/123 |
| 6,005,494 A * | 12/1999 | Schramm | 340/995.19 |
| 6,317,686 B1 | 11/2001 | Ran | |
| 7,369,938 B2 * | 5/2008 | Scholl | 701/428 |
| 7,493,209 B1 * | 2/2009 | Altrichter et al. | 701/423 |
| 7,591,339 B2 | 9/2009 | Sugimoto et al. | |
| 7,783,417 B2 * | 8/2010 | Vavrus | 701/423 |
| 8,185,302 B2 * | 5/2012 | Schunder | 701/408 |
| 8,239,127 B2 * | 8/2012 | Kono et al. | 701/123 |
| 2004/0236474 A1 * | 11/2004 | Chowdhary et al. | 701/1 |
| 2005/0055157 A1 * | 3/2005 | Scholl | 701/207 |
| 2007/0005237 A1 * | 1/2007 | Needham et al. | 701/202 |
| 2007/0021909 A1 * | 1/2007 | Matsuda | 701/208 |
| 2008/0125958 A1 * | 5/2008 | Boss et al. | 701/123 |
| 2008/0208401 A1 * | 8/2008 | Kumar et al. | 701/19 |
| 2008/0270016 A1 * | 10/2008 | Proietty et al. | 701/123 |
| 2009/0005974 A1 * | 1/2009 | Lenneman et al. | 701/209 |
| 2010/0010732 A1 * | 1/2010 | Hartman | 701/200 |
| 2010/0088011 A1 * | 4/2010 | Bruce et al. | 701/200 |
| 2010/0174484 A1 | 7/2010 | Sivasubramaniam et al. | |
| 2011/0246004 A1 * | 10/2011 | Mineta | 701/22 |
| 2011/0246010 A1 * | 10/2011 | de la Torre Bueno | 701/22 |
| 2011/0246019 A1 * | 10/2011 | Mineta | 701/33 |
| 2013/0245870 A1 * | 9/2013 | Mineta | 701/22 |

FOREIGN PATENT DOCUMENTS

| | | |
|---|---|---|
| JP | 10-38594 A | 2/1998 |
| JP | 10-122883 A | 5/1998 |
| JP | 2000-2553 A | 1/2000 |
| JP | 2005-98749 A | 4/2005 |
| JP | 2006-98174 A | 4/2006 |
| JP | 2006-273311 A | 10/2006 |
| JP | 2008-107155 A | 5/2008 |
| WO | WO 2007/061409 A2 | 5/2007 |
| WO | WO 2009/071369 A1 | 6/2009 |

* cited by examiner

FIG. 2

3-D ROAD MAP

| LINK ID | INTERPOLATION POINT NO. | X (LONGITUDE) | Y (LATITUDE) | Z (ALTITUDE [m]) |
|---|---|---|---|---|
| 1 | 1 | 135.112 | 39.045 | 10 |
| 1 | 2 | 135.112 | 39.046 | 11 |
| 1 | 3 | 135.113 | 39.047 | 11 |
| 1 | 4 | 135.113 | 30.048 | 13 |
| 2 | 1 | 135.113 | 30.048 | 13 |
| 2 | 2 | 135.113 | 39.047 | 11 |
| 2 | 3 | 135.112 | 39.046 | 11 |
| 2 | 4 | 135.112 | 39.045 | 10 |
| 3 | 1 | 135.134 | 38.679 | 32 |
| 3 | 2 | 135.135 | 38.680 | 35 |
| 3 | 3 | 135.136 | 38.681 | 39 |
| 3 | 4 | 135.137 | 38.682 | 32 |
| ⋮ | ⋮ | ⋮ | ⋮ | ⋮ |

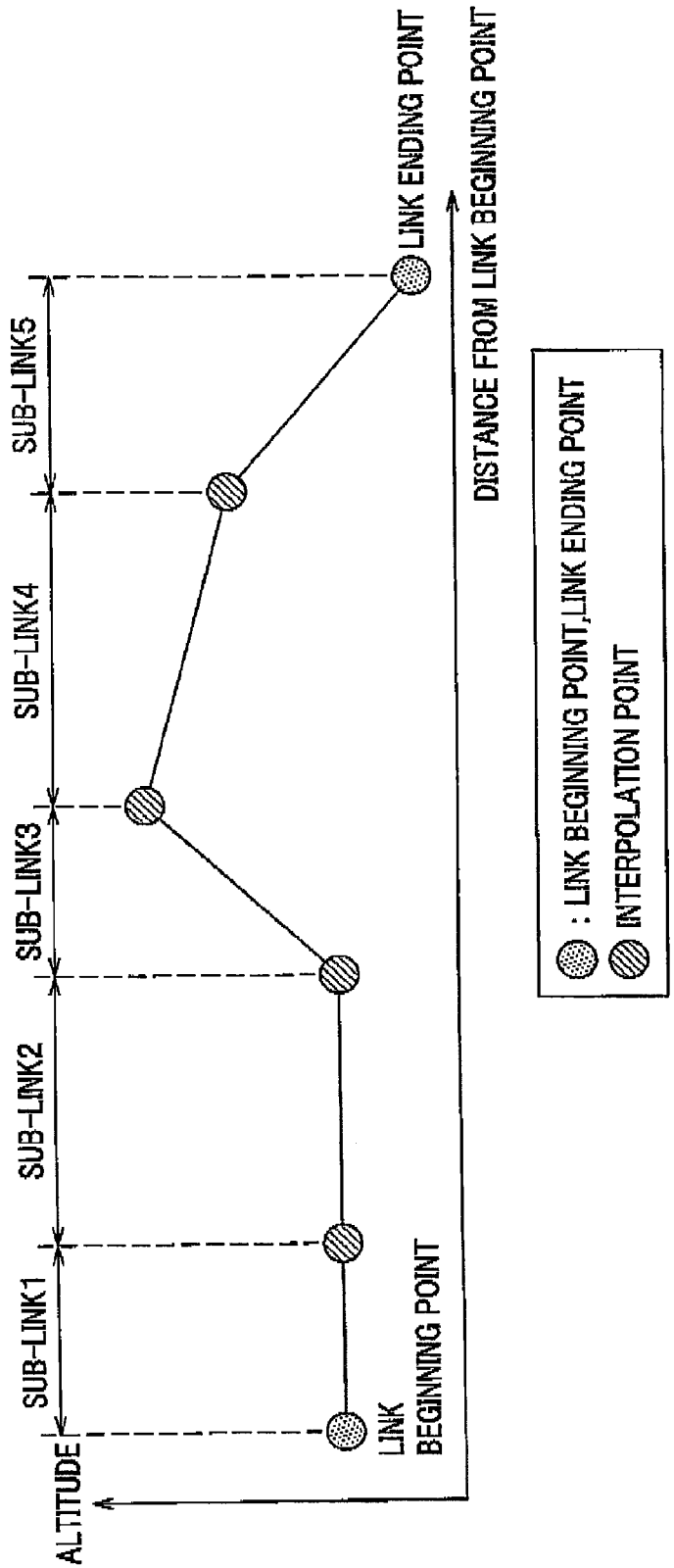

FIG. 4A

VARIATION OF MECHANICAL ENERGY

| SUB-LINK NO. | FRICTION + POSITION | ACCELERATION MODE | CONSTANT-SPEED MODE | DECELERATION MODE | CATEGORY |
|---|---|---|---|---|---|
| SUB-LINK1 | 20 | 120 | 20 | −80 | C |
| SUB-LINK2 | 30 | 130 | 30 | −70 | C |
| SUB-LINK3 | 120 | 220 | 120 | 20 | D |
| SUB-LINK4 | −60 | 40 | −60 | −160 | B |
| SUB-LINK5 | −120 | −20 | −120 | −220 | A |

↳ (GEOMETRY PARAMETER OF SUB-LINK)

FIG. 4B

CATEGORY OF SUB-LINKS

| | FUEL CONFUMPTION | | |
|---|---|---|---|
| | ACCELERATION TRAVEL MODE | CONSTANT-SPEED TRAVEL MODE | DECELERATION TRAVEL MODE |
| CATEGORY A | NOT CONSUMED | NOT CONSUMED | NOT CONSUMED |
| CATEGORY B | CONSUMED | NOT CONSUMED | NOT CONSUMED |
| CATEGORY C | CONSUMED | CONSUMED | NOT CONSUMED |
| CATEGORY D | CONSUMED | CONSUMED | CONSUMED |

FIG. 4C

GEOMETRY PARAMETER

| CATEGORY | SUM OF SUB-LINKS' GEOMETRY PARAMETERS | GEOMETRY PARAMETER |
|---|---|---|
| CATEGORY A | −120 | — |
| CATEGORY B | −60 | $M_B$ |
| CATEGORY C | 50 | $M_C$ |
| CATEGORY D | 120 | $M_D$ |

FIG. 6

GEOMETRY PARAMETER

| LINK ID | $M_B$ | $M_C$ | $M_D$ |
|---|---|---|---|
| 1 | 0 | 20 | 0 |
| 2 | −60 | 50 | 120 |
| 3 | −20 | 10 | 40 |
| 4 | −20 | 5 | 0 |
| ⋮ | ⋮ | ⋮ | ⋮ |

FIG. 7

VEHICLE-TYPE PARAMETER

| VEHICLE TYPE ID | VEHICLE TYPE | VEHICLE WEIGHT (W) | FUNDAMENTAL FUEL CONSUMPTION (F) | HEAT EQUIVALENT (E) | DRAG COEFFICIENT (k) |
|---|---|---|---|---|---|
| 1 | VEHICLE TYPE A | 1,500kg | 0.3 | 0.0010 | 0.3 |
| 2 | VEHICLE TYPE B | 2,000kg | 1 | 0.0012 | 0.5 |
| ⋮ | ⋮ | ⋮ | ⋮ | ⋮ | ⋮ |

VEHICLE-TYPE-SELECTION PROCESS

FIG. 10

STATISTICALLY-STORED TRAFFIC INFORMATION

| LINK ID | DAY TYPE | TIME-FRAME-BASED TRAVEL TIME (SECOND) | | | | | |
|---|---|---|---|---|---|---|---|
| | | 00:00–00:30 | 00:30–01:00 | 01:00–01:30 | 01:30–02:00 | ... | 23:30–24:00 |
| 1 | WEEKDAY | 20 | 15 | 10 | 10 | ... | 25 |
| | HOLIDAY | 30 | 20 | 15 | 10 | ... | 20 |
| 2 | WEEKDAY | 90 | 95 | 90 | 80 | ... | 80 |
| | HOLIDAY | 80 | 65 | 60 | 60 | ... | 90 |

TRAVEL-PATTERN ESTIMATION PROCESS

FIG. 16

| LINK ID | DATA | |
|---|---|---|
| 1 | SEQUENCE OF COORDINATES | |
| | INTERPOLATION NO. | COORDINATES |
| | 1 | (N35.345,E135.123) |
| | 2 | (N35.345,E135.124) |
| | 3 | (N35.349,E135.130) |
| | 4 | (N35.350,E135.131) |
| | CONNECTION LINK | |
| | CONNECTION POINT | CONNECTION LINK NO. |
| | 1 | (4,5,20) |
| | 4 | (2,10,11) |
| | LINK PROPERTY | |
| | LINK TYPE | ORDINARY NATIONAL ROAD |
| | SPEED LIMIT | 50km/h |
| | LINK LENGTH | 1200m |
| | GEOMETRY PARAMETER | |
| | $M_B$ | −60 |
| | $M_C$ | 50 |
| | $M_D$ | 120 |
| 2 | SEQUENCE OF COORDINATES | |
| | INTERPOLATION NO. | COORDINATES |
| | 1 | (N35.350,E135.131) |
| | 2 | (N35.353,E135.140) |
| | 3 | (N35.360,E135.140) |
| | 4 | (N35.362,E135.140) |
| | CONNECTION LINK | |
| | CONNECTION POINT | CONNECTION LINK NO. |
| | 1 | (1,10,11) |
| | 4 | (3,15,50) |
| | LINK PROPERTY | |
| | LINK TYPE | PREFECTUAL ROAD |
| | SPEED LIMIT | 40km/h |
| | LINK LENGTH | 400m |
| | GEOMETRY PARAMETER | |
| | $M_B$ | 0 |
| | $M_C$ | 100 |
| | $M_D$ | 150 |
| | ⋮ | |

NAVIGATION SYSTEM AND NAVIGATION METHOD OF ROUTE PLANNING USING VARIATIONS OF MECHANICAL ENERGY

CROSS REFERENCE TO RELATED APPLICATIONS

This application is a continuation-in-part of U.S. patent application Ser. No. 12/608,340, filed Oct. 29, 2009, and claims the foreign priority benefit under Title 35, United States Code, §119 (a)-(d), of Japanese Patent Application No. 2008-281968, filed on Oct. 31, 2008, in the Japan Patent Office, the disclosures of which are herein incorporated by reference in its entirety.

BACKGROUND OF THE INVENTION

1. Field of the Invention

The present invention relates to a navigation device and a navigation method capable of route search and route guide for a vehicle in a fuel-efficient manner.

2. Related Art

A navigation system searches a route from a departure point to a destination and proposes the searched route to a driver. Usually, in the route search of this kind, road links, each having a some kind of predetermined cost (hereinafter called a link cost) and forming a probable route between the departure point and the destination, undergoes calculation using a cost function based on its link cost of each road link so that the result in the calculation of the cost function should be minimized.

Usually, the cost function used in a navigation system of this kind is a time necessary to travel a route between the departure point and the destination; or the distance (length) of the route. That is, the link cost set for each road link in this case is a time necessary to travel the route or the length of each link. The navigation system uses a predetermined algorithm and searches a time-saving route or a distance-saving route, which has the result calculated and minimized by using the cost function.

A cost function for route search may be amount of fuel to be consumed (hereinafter called fuel consumption). The link cost of each road link in this case must have a predetermined fuel consumption of a vehicle which will travel the road link. The navigation device can search the fuel-efficient route, which can minimize fuel consumption, by using the link costs each having a predetermined fuel consumption.

The fuel consumption of the vehicle which will travel each road link must be measured or estimated prior to setting the fuel consumption as a link cost of each road link. The following patent documents disclose examples of navigation devices which search the fuel-efficient route by measuring or estimating fuel consumption of each road link.

For example, Japanese Patent Laid-open Publication No. 2006-098174 (hereinafter called Patent Document 1) discloses a technique of preparing correlation among geometry, congestion condition, and fuel efficiency in advance; and estimating fuel consumption of each road link based on a three-dimensional road map and traffic condition of each road link. Japanese Patent Laid-open Publication No. H02-278116 (hereinafter called Patent Document 2) discloses a method of estimating fuel consumption of each road link based on a record of fuel consumption obtained in the past. Japanese Patent Laid-open Publication No. H10-122883 (hereinafter called Patent Document 3) discloses a method of estimating fuel consumption of each road link by multiple regression analysis using a record of fuel consumption obtained in the past and various parameters, indicative of road conditions, such as the length of each link, the number of traffic signals, the number of traffic lanes, and altitude above sea level etc.

In the invention disclosed in Patent Document 1, a three-dimensional road map is indispensable for estimating the fuel consumption of each road link accurately. Preferably, such a three-dimensional road map should include information indicative of ups and downs in each road link in addition to the difference of altitude from sea level between the beginning point and the ending point of each road link. However, a large-capacity storage device is necessary for storing such a three-dimensional road map which usually has a considerable data size. A large-capacity storage device is an unbearable burden for an on-board navigation device.

Patent Document 2 discloses a method not requiring a three-dimensional road map, but a link cost indicative of fuel consumption of a road link can be obtained unless the vehicle has record of travel. In contrast, the invention disclosed in Patent Document 3 can estimate fuel consumption of a road link for which the vehicle has a record of travel. However, the information indicative of ups and downs in each road link or congestion information can hardly be reflected on data of the fuel consumption in this case.

In addition, no prior art considers a capability of navigation system for obtaining various fuel consumption which varies in accordance with various type of vehicles each having different vehicle weight and fuel efficiency. For example, Patent Document 1 does not disclose a method of estimating a link cost indicative of fuel consumption for each type of vehicle.

In the invention disclosed in Patent Document 2 or 3, a set of data indicative of fuel consumption of various type of vehicles travelling various type of road links must be obtained prior to calculating a link cost indicative of fuel consumption or obtaining parameters used in multiple regression analysis. However, a solution for that purpose will be very costly and time-consuming.

SUMMARY OF THE INVENTION

In view of the above-mentioned problems in the prior arts, it is an object of the present invention to provide a navigation device which is easy to be installed in various type of vehicles and is capable of reducing the information data size stored in the on-board navigation device and searching a fuel-efficient route.

In order to solve the aforementioned problems, the present invention provides a navigation device for searching a destination and guiding a vehicle to the destination. The navigation device includes: a road map data storage unit storing road map data therein; a geometry parameter storage unit for storing data of variations of energy calculated previously for road links included in the road map data by using altitude information, the data of variations of energy being stored as geometry parameters; an energy variation calculation unit for calculating the variation of energy of the vehicle travelling on each road link included in the road map data based on the data of variation of energy according to each travel pattern of the vehicle; and a route-search unit for searching a fuel-efficient route for the vehicle based on the variation of energy calculated by the energy variation calculation unit.

In the navigation device according to the present invention, the geometry parameter storage unit stores the summation of the variations of energy of the vehicle travelling each road link in a constant-speed travel mode per each estimate state of fuel consumption amounts of an acceleration travel mode, a deceleration travel mode, and the constant-speed travel mode as the geometry parameters of the road link.

In the present invention, the energy variation calculation unit: has a link-travelling time-calculating unit for obtaining a link-travelling time of the road link; estimates an acceleration-travel pattern, a deceleration-travel pattern, and a constant-speed-travel pattern of the vehicle travelling the road link based on the obtained link-travelling time of the road link and length of the road link obtained from the road map data storage unit; and estimates fuel consumption of the vehicle travelling the road link based on the estimated travel patterns of the vehicle and the geometry parameter.

In the present invention, the route-search unit may further have an input unit for inputting vehicle information thereinto which indicates type of the vehicle; and estimate the fuel consumption of the vehicle, the type of which is inputted into the input unit.

Therefore, the navigation device does not need information of the three-dimensional road map including the altitude information of the road link since the navigation device uses the geometry parameter of each road link when the route-search unit of the navigation device estimates the fuel consumption of the vehicle travelling each road link. Accordingly, the information data size stored in the on-board navigation device can be reduced. The navigation device does not have to calculate energy consumption of the vehicle when estimating the fuel consumption, i.e., when travelling the vehicle, since the geometry parameter indicates the result of calculation conducted for obtaining the energy consumption. Therefore, the on-board navigation device can reduce calculations therein to a greater degree.

In the present invention, the variation of energy of the vehicle is normalized by using the vehicle weight etc. for calculating the geometry parameter. Since the geometry parameter can be used generally for all vehicle types, the navigation device may only have to consider the vehicle's parameter, e.g. the vehicle weight or the efficiency of engine when estimating the fuel consumption of the vehicle travelling each road link.

The present invention can provide an on-board navigation device which is applicable to various vehicle types and is capable of reducing the information data size and calculations therein used for searching a fuel-efficient route.

BRIEF DESCRIPTION OF THE DRAWINGS

FIG. 2 shows records of a three-dimensional road map stored in a three-dimensional road map storage section.

FIG. 3 shows a profile indicating altitude of a road link divided into a plurality of sub-links.

FIGS. 4A to 4C shows various parameters used in a link shape compression process. FIG. 4A shows variation of mechanical energy. FIG. 4B shows categories of sub-links. FIG. 4C shows an example of geometry parameters.

FIG. 6 shows records of geometry parameter stored in a geometry parameter storage unit.

FIG. 7 shows data of vehicle-type parameters stored in a vehicle-type parameter storage unit.

FIG. 10 shows records indicative of statistically-stored traffic information stored in a storage section for storing statistically-stored traffic information.

FIG. 16 shows records of data of road links including information of geometry parameters.

DETAILED DESCRIPTION OF THE INVENTION

Embodiments of the present invention will be explained in detail with reference to the accompanying drawings as follows.

(1. General Structure of Navigation System)

Figure 1:
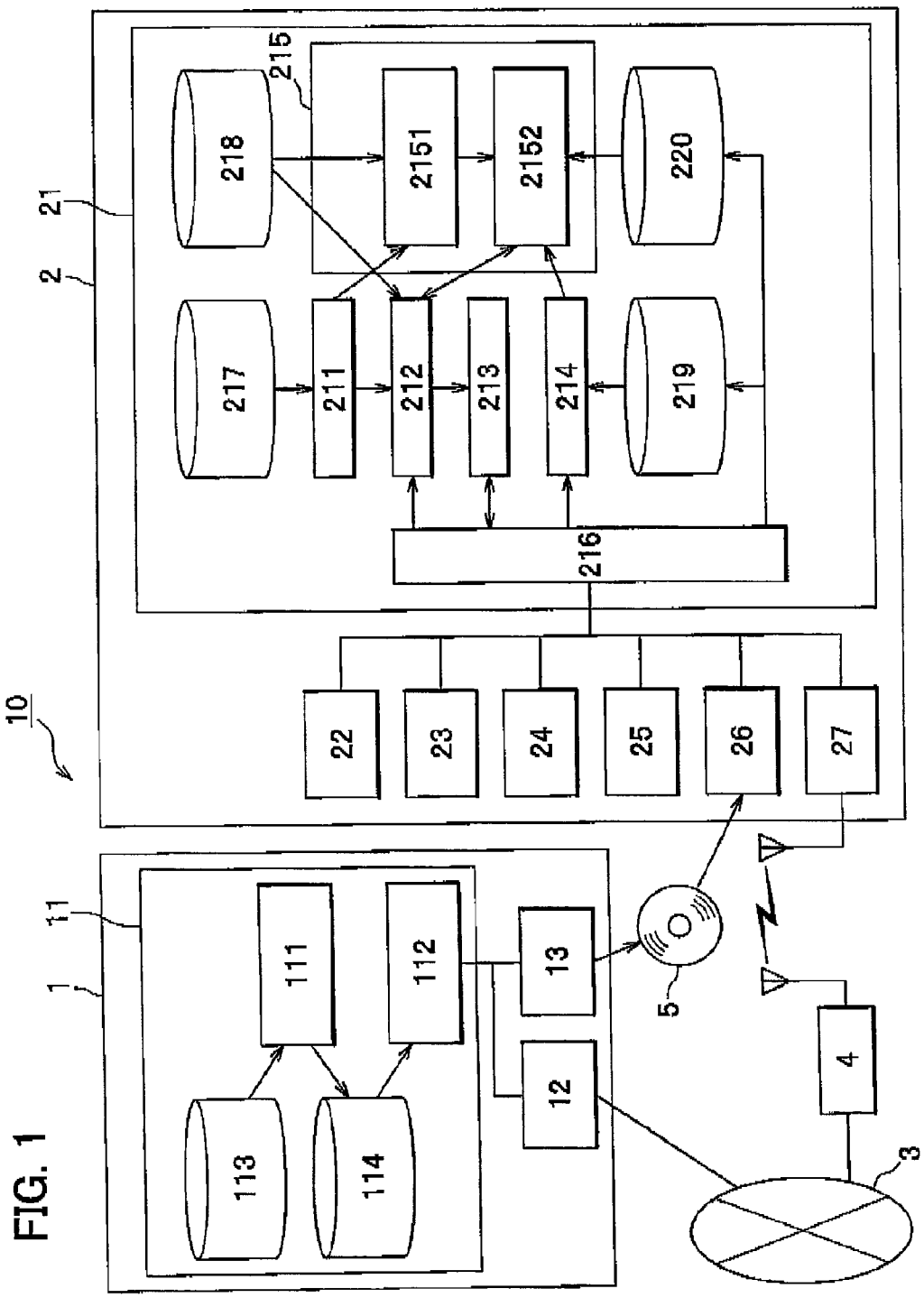
FIG. 1 is a functional block diagram of a navigation system according to an embodiment of the present invention.

FIG. 1 shows a functional block diagram of a navigation system according to an embodiment of the present invention. As shown in FIG. 1, a navigation system 10 includes a central device 1 installed at a traffic information center etc.; and an on-board terminal device 2 installed in a vehicle such as a passenger car etc. Information is sent between the central device 1 and the on-board terminal device 2 by using portable storage media including a digital versatile disk (DVD) 5; through a communication network 3 including telephone lines or Internet and a mobile-phone network base station 4.

The central device 1 includes: a central-processing device 11 which is a general-purpose information-processing device; a communication device 12 including a router connected to the communication network 3; and a media drive unit 13 including a reader-writer unit for the portable storage media such as the DVD 5 etc.

The central-processing device 11 includes a central processing unit (CPU, omitted in the drawings) which is a hardware conducting an information process; and a storage device (e.g., a semiconductor memory devices, hard disc drive units, or the likes, omitted in the drawings) for storing various information including information-processing program etc.

As shown in FIG. 1, the central-processing device 11 includes various function blocks, i.e., a link shape compression unit 111; a data I/O controller 112; a three-dimensional road map storage section 113; a geometry parameter storage unit 114, and the likes.

The link shape compression unit 111 obtains three-dimensional shape information indicating ups and downs included in a road link of the three-dimensional road map stored in the three-dimensional road map storage section 113. When a vehicle travels along the three-dimensional shape of each road link, the link shape compression unit 111 is operable as an unit for calculating variation of energy and calculates the variation of energy of the travelling vehicle. The link shape compression unit 111 further calculates geometry parameter based on the variation of energy of the vehicle, and stores the calculated geometry parameter in the geometry parameter storage unit 114. It should be noted that processes conducted by the link shape compression unit 111 will be explained later in detail.

The data I/O controller 112 controls transmission of information input into and output from the communication device 12 and the media drive unit 13. According to the present embodiment, the data I/O controller 112 sends the geometry parameter stored in the geometry parameter storage unit 114 to the on-board terminal device 2 through the communication device 12, the communication network 3, and the base station 4. Alternatively, the data I/O controller 112 writes the geometry parameter into the portable storage media such as the DVD 5 by using the media drive unit 13.

The CPU included in the central-processing device 11 provides the functions of the link shape compression unit 111 and the data I/O controller 112 by performing a predetermined program stored in the storage device. The three-dimensional road map storage section 113 and the geometry parameter storage unit 114 exist in the storage device.

The on-board terminal device 2 includes a navigation-processing device 21 which is a general-purpose information-processing device; a GPS receiver 22 which receives Global Positioning System (GPS) signals sent from a GPS satellite and determines the current position of the vehicle; a direction sensor 23 including a gyroscope etc.; a display unit 24 including a liquid crystal display (LCD) etc.; an input device 25 including a touch panel sensor and a remote-controller; a media drive unit 26 including a reader/writer unit for portable storage media such as a DVD 5; and a communication device 27 such as a mobile phone.

The navigation-processing device 21 includes a CPU (omitted in the drawings) which is a hardware conducting an information process; and a storage device (e.g., a semiconductor memory device, a hard disc drive unit, or the likes, omitted in the drawings) for storing various information including information-processing program etc.

As shown in FIG. 1, the navigation-processing device 21 includes various function blocks, i.e., a travel-time estimation unit 211; a route-search unit 212; a route-guidance unit 213; a vehicle-type selector 214; a fuel-consumption estimation unit 215; a data input/output (hereinafter I/O) controller 216; a storage section 217 for storing statistically-stored traffic information (hereinafter called the storage section 217); a road map storage unit 218; a vehicle-type parameter storage unit 219; a geometry parameter storage unit 220, and the likes. The function blocks will be explained in detail later.

The CPU included in the navigation-processing device 21 provides the functions of the travel-time estimation unit 211, the route-search unit 212, the route-guidance unit 213, the vehicle-type selector 214, the fuel-consumption estimation unit 215, and the data I/O controller 216 by performing a predetermined program stored in the storage device. The storage section 217, the road map storage unit 218, the vehicle-type parameter storage unit 219, and the geometry parameter storage unit 220 exist in the storage device.

(2. Operations of Central Device 1)

A link shape compression process conducted by the central-processing device 11 will be explained with reference to FIGS. 2 to 6. The link shape compression unit 111 carries out the link shape compression process for compressing a three-dimensional road map having a considerable data size into geometry parameter data having a modest data size.

Figure 5:
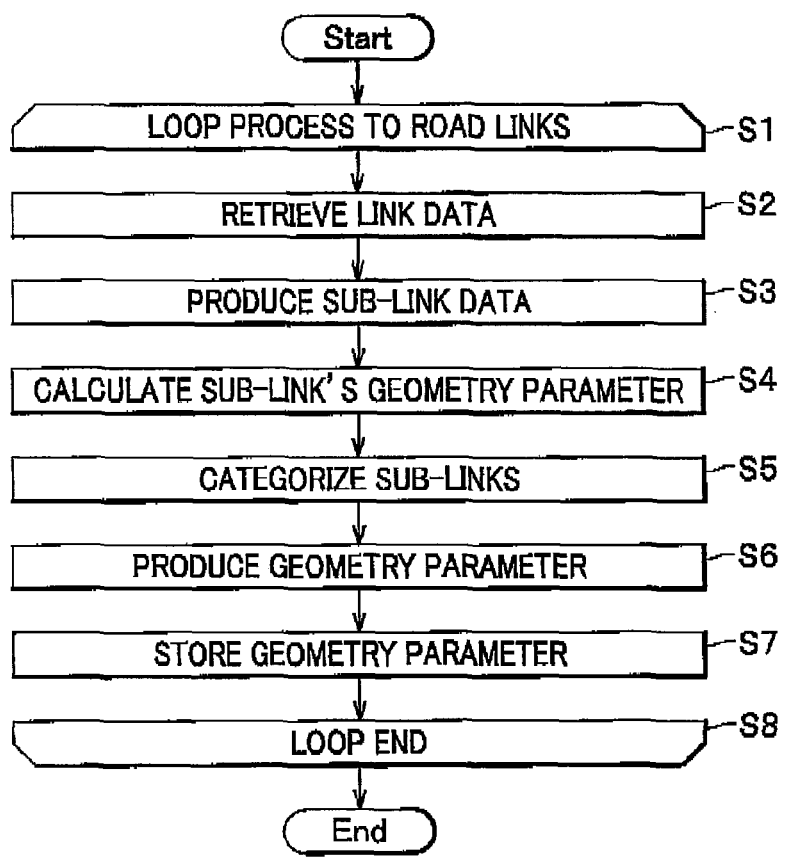
FIG. 5 is a flowchart of the link shape compression process.

FIG. 2 shows records of a three-dimensional road map stored in the three-dimensional road map storage section 113. FIG. 3 shows a profile indicating altitude of a road link which is divided into a plurality of sub-links. FIGS. 4A to 4C shows various parameters used in a link shape compression process. FIG. 4A shows variation of mechanical energy. FIG. 4B shows categories of sub-links. FIG. 4C shows examples of geometry parameters. FIG. 5 is a flowchart of the link shape compression process. FIG. 6 shows records of geometry parameter stored in the geometry parameter storage unit 114.

The three-dimensional road map includes three-dimensional position and shape of each road link. In the three-dimensional road map, the position and shape of each road link are represented by a sequence of points each having a three-dimensional coordinate (X, Y, and Z). Therefore, a linear road link having a fixed gradient can be represented by using coordinates of the beginning point and the ending point of the road link. Alternatively, interpolation points are provided on a road link having folding points or gradient-changing points thereon.

Usually, a road link has an arbitrary number of interpolation points adjacent to each other at arbitrary intervals since it must represent an arbitrary three-dimensional shape of a road surface accurately. Therefore, interpolation points may not have to be provided on a linear road link. A road link indicating a curved road having a smaller radius may have interpolation points disposed at a narrow interval, e.g. 10 meter. In general, a road link is represented by at least two points, i.e., the beginning point and the ending point of the road link, each having a three-dimensional coordinate.

As shown in FIG. 2, the three-dimensional road map has records each having a link ID (or a road link ID), an interpolation point number, a longitude, a latitude, and an altitude. Each record also indicates coordinates of the beginning point, the ending point, and the interpolation point of each road link.

Each road link has the link ID which is an identification number identical with an identification number put to each road link provided on a two-dimensional road map stored in the road map storage unit 218 of the on-board terminal device 2. In one segment of road link, a road link is defined separately between in an up-bound direction and a down-bound direction. The interpolation point number is provided for identifying the interpolation points. In each road link, the beginning point and the ending point are interpolation points. The interpolation points are numbered in an ascending order from the beginning point which is numbered "1". The longitude, latitude, and altitude of each interpolation point are indicated by the three-dimensional coordinates X, Y, and Z respectively.

A theory used in the link shape compression process will be explained as follows.

As shown in FIG. 3, a road link usually has a plurality of interpolation points dividing the road link into a plurality of sub-links. Each sub-link is approximated by using a line segment. Each sub-link of the road link indicates relationship of the beginning point of the road link and each sub-link in distance and altitude since fuel consumption is affected by difference in altitude or by gradient of each road link.

The travel condition of a vehicle can be categorized into three travel modes, more specifically, an acceleration travel mode, a constant-speed travel mode, and a deceleration travel mode. Fuel consumption increases if a vehicle travels on a flat (zero gradient) road in the acceleration travel mode since the vehicle must increase its kinetic energy. In contrast, fuel consumption decreases if the vehicle travels on the flat road in the constant-speed travel mode since the constant-speed can be maintained as long as energy withstanding the rolling friction is applied to the vehicle. No fuel is consumed if the vehicle travels on the flat road in the deceleration travel mode since the vehicle travelling in the deceleration travel mode needs no energy.

The fuel consumption of the vehicle travelling a slope must be calculated in consideration of potential energy. In an attempt to observe how mechanical energy M varies while the vehicle is travelling a sub-link having a predetermined gradient, an equation 1 relating to the variation of kinetic energy $\Delta K$ is defined as follows.

The fuel consumption of the vehicle travelling a slope must be calculated in consideration of potential energy. In an attempt to observe how mechanical energy $\alpha M$ varies while the vehicle is travelling a sub-link having a predetermined gradient, an equation 1 relating to the variation of mechanical energy $\Delta M$ is defined as follows.

$$\Delta M = FR + AP + AK \qquad \text{(Equation 1)}$$

where FR indicates the energy of friction loss;
ΔP indicates the variation of potential energy; and
ΔK indicates the variation of kinetic energy The variation of mechanical energy ΔM is normalized by using the weight of the vehicle. That is, the variation of mechanical energy ΔM is defined by a unit weight of the vehicle. The variation of mechanical energy ΔM is calculated by further using friction coefficient, and acceleration rate during a temporary speed drop which are independent from factors relating to road surface condition, the type of vehicle, and personal preference of a driver. That is, the friction coefficient and the acceleration rate during a temporary speed drop are averaged values and are obtainable from information including the vehicle design or driving test etc. Drag (i.e. air resistance) which depends on a travel speed is ignorable in the explanation of the embodiments. In the explanation of the present embodiment, acceleration rates of a vehicle in an accelerated mode and a decelerated mode are assumed to be identical.

In the link shape compression process, the link shape compression unit 111 calculates the variations of kinetic energy ΔK of the vehicle travelling each sub-link in the acceleration travel mode, the constant-speed travel mode, and the deceleration travel mode. FIG. 4A shows an example of the variations of kinetic energy ΔK calculated for sub-links 1 to 5 of the road link shown in FIG. 3.

Values shown in a column titled "FRICTION+POSITION" indicate energies of "friction+position" of Equation 1. Values show in a column titled "ACCELERATION TRAVEL MODE" indicates variation of kinetic energy ΔK of the vehicle in the acceleration travel mode. Values show in a column titled "CONSTANT-SPEED TRAVEL MODE" indicates variation of kinetic energy ΔK of the vehicle in the constant-speed travel mode. Values show in a column titled "DECELERATION TRAVEL MODE" indicates variation of kinetic energy ΔK of the vehicle in the deceleration travel mode.

The normalized variation of kinetic energy αK of the vehicle in the acceleration travel mode or the deceleration travel mode is indicated by an equation ΔK=G×L where G indicates acceleration rate and L indicates the length of a sub-link. If G is a fixed value and satisfies G>0 in the present embodiment, ΔK=+G×L indicates the variation of kinetic energy ΔK of the vehicle in the acceleration travel mode, and ΔK=−G×L indicates the variation of kinetic energy ΔK of the vehicle in the deceleration travel mode since the magnitude (i.e., the absolute value) of acceleration rate G is identical between the acceleration travel mode and the deceleration travel mode. p In FIG. 4A, the sub-links 1 and 2 have small energies in the column titled "FRICTION+POSITION" where ΔP=0 since these sub-links have no gradient as shown in FIG. 3. The sub-link 3 has a greater energy in the column titled "FRICTION+POSITION" by ΔP. The sub-links 4 and 5 have energies in negative value in the column titled "FRICTION+POSITION" since gradients of the sub-links 4 and 5 become negative, and thereby ΔP becomes negative.

If the energies in the column of "friction +position" are in negative, the variation of mechanical energy ΔM may sometimes become negative in not only the deceleration travel mode but also constant-speed travel mode. (For example, see the sub-link 4). In this case, energy does not have to be supplied to the vehicle travelling in the constant-speed travel mode. That is, the vehicle in this case consumes no fuel. Sometimes, the variation of mechanical energy ΔM of the vehicle travelling in the acceleration travel mode becomes negative. (See sub-link 5). The vehicle consumes no fuel even if travelling in the acceleration travel mode.

Based on analyses of these cases, the sub-links can be categorized as shown in FIG. 4B according to whether the vehicle consumes the fuel or not in each travel mode. A sub-link shown in the category A indicates that the vehicle consumes no fuel in every travel mode (See the sub-link 5). An example of a sub-link in the category A is a steep downhill on which the vehicle consumes no fuel even if travelling in the acceleration travel mode. A sub-link shown in the category B indicates that the vehicle consumes fuel in the acceleration travel mode but consumes no fuel in the constant-speed travel mode and the deceleration travel mode (See the sub-link 4). An example of a sub-link in the category B is a gentle downhill on which the vehicle consumes no fuel when travelling in the constant-speed travel mode and the deceleration travel mode. A sub-link shown in the category C indicates that the vehicle consumes fuel in the constant-speed travel mode and the acceleration travel mode but consumes no fuel in the deceleration travel mode (See the sub-links 1 and 2). An example of a sub-link in the category C is a flat road, an extremely gentle downhill, or a gentle uphill. A sub-link shown in the category D indicates that the vehicle consumes fuel in every travel mode (See the sub-link 3). An example of a sub-link in the category D is a steep uphill on which the vehicle consumes fuel even if travelling in the deceleration travel mode.

The column titled "CATEGORY" in FIG. 4A shows the result of categorization conducted for each sub-link of the road link shown in FIG. 3.

In FIG. 4A, energy shown in the column titled "FRICTION+POSITION" is determined according to the three-dimensional shape of each sub-link. That is, FR indicating the energy of friction loss is determined according to a travelling distance of each sub-link, which is identical with the length of each sub-link; and variation ΔP of potential energy is determined according to the vertical difference of two ends of a sub-link. The variation of energy in each sub-link shown in the column titled "FRICTION+POSITION" is determined according to the three-dimensional shape of each sub-link; therefore, the variation of energy in each sub-link does not depend on the travel mode of the vehicle. From this point of view, the energy shown in the column titled "FRICTION+POSITION" may be construed as each sub-link's geometry parameter. Hereinafter in the present specification, the energy shown in the column titled "FRICTION+POSITION" is called "geometry parameter of each sub-link".

In addition, the present invention obtains the variation of energy in the column titled "FRICTION+POSITION" by normalizing the vehicle weight and calculating the variation of energy per unit weight; and the present invention uses a constant friction coefficient for estimating fuel consumption. The each sub-link's geometry parameter obtained in the aforementioned manner may be used generally for all vehicle types; therefore, the present invention does not have to produce data of geometry parameter for each vehicle type.

In a link shape compression process, the link shape compression unit 111 defines four geometry parameters $M_A$, $M_B$, $M_C$, and $M_D$ as follows by using geometry parameters of a plurality of sub-links forming a road link.

$M_i$=(The sum of geometry parameters of all the sub-links belonging to category i)   (Equation 2)

where i=A, B, C, and D

Values in the column titled "SUM OF SUB-LINKS' GEOMETRY PARAMETERS" shown in FIG. 4C are obtained by calculating the sum of geometry parameters of all the sub-links belonging to categories A to D shown in FIG. 4A. For example, values shown in the column titled "SUM OF SUB-LINKS' GEOMETRY PARAMETERS" shown in FIG. 4C are obtained by calculating the sum of energies of the "sub-links 1 and 2" in the columns titled "FRICTION+POSITION" categorized in the "category C". Alternatively, a sum of energies in the columns titled "CONSTANT-SPEED TRAVEL MODE" may be calculated in the present invention.

Although details will be explained later, the present invention can calculate the fuel consumption of a road link by using the geometry parameters $M_A$, $M_B$, $M_C$, and $M_D$, and vehicle-type parameters such as vehicle weight. That is, the present embodiment is capable of calculating the fuel consumption of a road link by using the geometry parameters of the road link in place of using a three-dimensional road map. That is, the data of three-dimensional link shapes indicated by information associated with three-dimensional position of each road link are compressed into data indicated by the geometry parameters $M_A$, $M_B$, $M_C$, and $M_D$.

It should be noted here that, as shown in FIG. 4B, the vehicle travelling the sub-links categorized in the category A consumes no fuel in the acceleration travel mode, the constant-speed travel mode, and the deceleration travel mode. Therefore, the geometry parameter $M_A$ corresponding to the category A will not be used for calculating the fuel consumption. For this reason, a cell in the column titled "GEOMETRY PARAMETER" and in a line titled "CATEGORY A" shows "-" in place of showing "$M_A$".

The aforementioned link shape compression process conducted by the link shape compression unit 111 of the central-processing device 11 will be summarized with reference to FIG. 5 as follows. As shown in FIG. 5, the link shape compression process in step Si is a loop process conducted to all the road links included in the three-dimensional road map storage section 113.

The CPU of the central-processing device 11 sets a link ID and retrieves link data having the link IDs from the three-dimensional road map storage section 113 (step S2). The link data are records stored in the three-dimensional road map storage section 113.

After that, the CPU produces sub-link data indicating distance and altitude from the beginning point of a link at each interpolation point based on the retrieved link data in step S3; and then, the CPU calculates variation of mechanical energy for each travel mode, i.e., each sub-link's geometry parameter as shown in FIG. 4A in step S4. In step S5, the CPU categorizes the sub-links in accordance with the calculated variation of mechanical energy.

In step S6, the CPU produces the geometry parameters $M_B$, $M_C$, and $M_D$, of the road link in accordance with each sub-link's geometry parameter. In step S7, the CPU stores the produced geometry parameters $M_B$, $M_C$, and $M_D$ in the geometry parameter storage unit 114. In step S8, the CPU determines as to whether the loop processes of steps S1 through S7 have been conducted for all the road links, and the CPU ends the loop processes if they have been conducted.

As shown in FIG. 6, each link's geometry parameter stored in the geometry parameter storage unit 114 has three kinds of data, i.e., $M_B$, $M_C$, and $M_D$. The geometry parameters shown in FIG. 6 is notably compressed to small size data as compared with data of the three-dimensional road map shown in FIG. 2.

The data I/O controller 112 uses the media drive unit 13 and writes the data of geometry parameter stored in the geometry parameter storage unit 114 into portable storage media such as a DVD 5, or sends the geometry parameter to the on-board terminal device 2 through the communication device 12, the communication network 3, and the likes.

(3. Operations of On-board Terminal Device 2)

Figure 8:
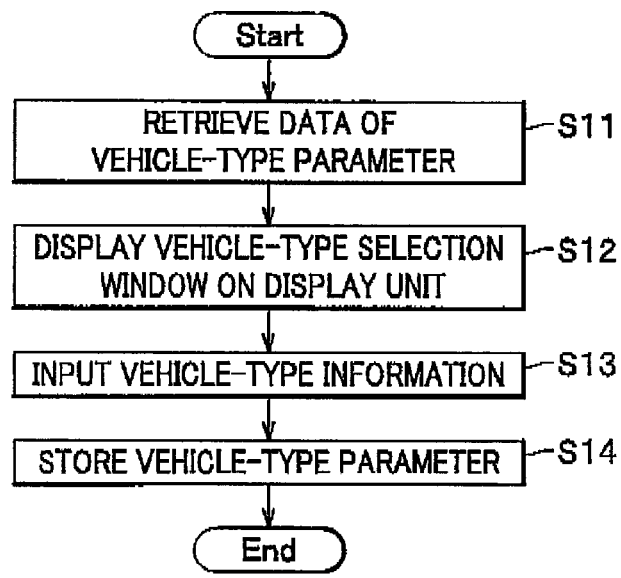
FIG. 8 is a flowchart of a vehicle-type selection process.
Figure 9:
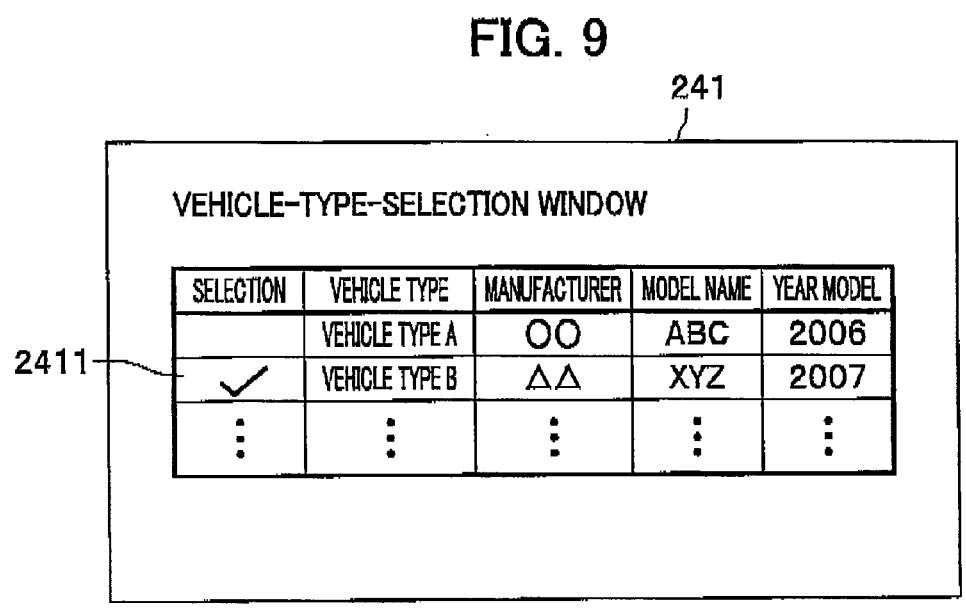
FIG. 9 shows a vehicle-type selection window displayed on a display unit.

A vehicle-type selection process conducted in the navigation-processing device 21 will be explained as follows with reference to FIGS. 7 to 9. The vehicle-type selector 214 conducts the vehicle-type selection process for selecting a model of the vehicle having the on-board terminal device 2 installed therein.

FIG. 7 shows data of vehicle-type parameters stored in a vehicle-type parameter storage unit. FIG. 8 is a flowchart of the vehicle-type selection process. FIG. 9 is an example of a vehicle-type selection window displayed on a display unit 24.

As shown in FIG. 7, vehicle-type parameters include data indicated by: vehicle type ID; vehicle type; vehicle weight W; fundamental fuel consumption F; heat equivalent E; drag coefficient k.

The fundamental fuel consumption F indicates the amount of fuel consumed per unit time for maintaining the operation of an engine against its internal resistance. The heat equivalent E is the amount of fuel consumed for obtaining a predetermined quantity of mechanical energy. The heat equivalent E is defined by an equation E=q/H where q indicates fuel consumption and H indicates mechanical energy. A drag coefficient k is defined by an equation K=Cd×ρ×A/2 where Cd is a drag coefficient of the vehicle, A indicates front projection area of the vehicle, and ρ indicates air density.

The following explanation is based on assumption that, the data I/O controller 216 receives data regarding the vehicle-type parameter externally by using media drive unit 26 or the communication device 27; and stores the data in the vehicle-type parameter storage unit 219.

Prior to obtaining data regarding a fuel-efficient route from the on-board terminal device 2, a driver of the vehicle must select the type of vehicle. When the driver inputs an instruction to start a vehicle-type selection process into the input device 25 etc., the CPU of the navigation-processing device 21 starts the vehicle-type selection process as shown in FIG. 8.

In the vehicle-type selection process, the CPU retrieves data of vehicle-type parameter from the vehicle-type parameter storage unit 219 in step S11, and then, the CPU displays a vehicle-type selection window 241 on the display unit 24 in step S12. The vehicle-type selection window 241 shows a list of vehicle type, manufacturer's name, model name, year model, and the like. The list has a column of check boxes for the driver to select the type of vehicle. When the driver selects the type of his or her vehicle and inputs it into the input device 25, the CPU receives the selected vehicle-type information in step S13, and then, the CPU stores the vehicle-type parameter, regarded as his or her own vehicle's parameters and designated in the input selected vehicle-type information, into the storage device in step S14.

The following explanation is based on assumption that the vehicle weight W of the vehicle-type parameter includes net weight of the vehicle and an adult driver's average weight. Alternatively, a passenger-number input window or the like may be provided for the driver, if necessary, to adjust the vehicle weight W by directly inputting the number of passengers aboard in the vehicle or the weight of luggage. Further alternatively, a sensor may be provided on the vehicle for detecting the vehicle weight W.

The on-board terminal device 2 conducting the aforementioned vehicle-type selection process can provide fuel-efficient routes for various type of vehicles accurately to the driver.

A fuel-consumption estimation process conducted by the navigation-processing device 21 will be explained with reference to FIGS. 10 to 13. The fuel-consumption estimation unit 215 carries out the fuel-consumption estimation process for estimating the fuel consumption of a currently-driving vehicle travelling on a road link.

Figure 11:
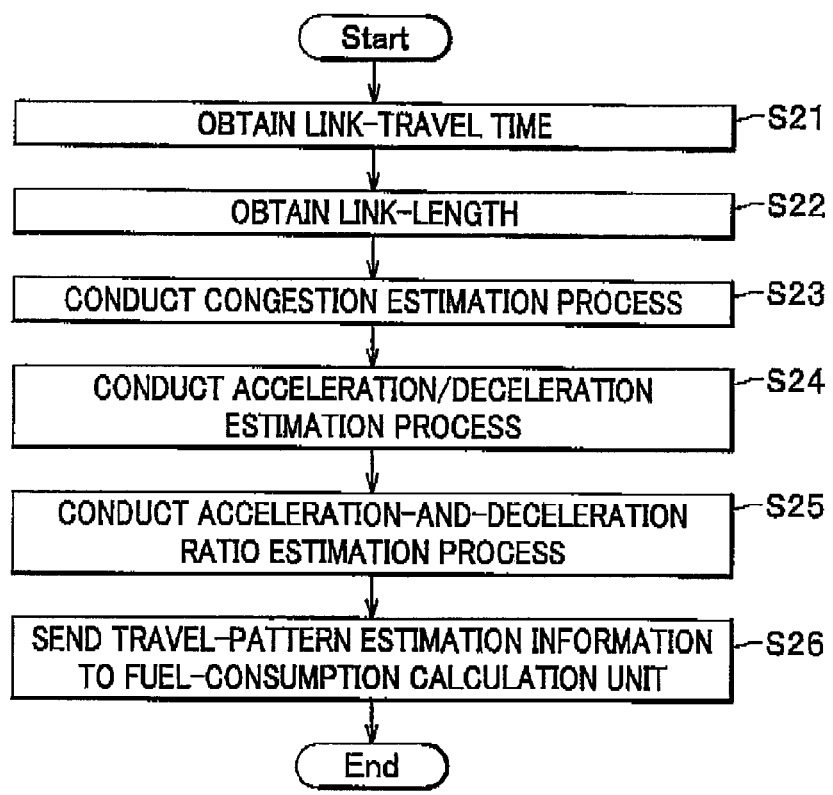
FIG. 11 shows a flowchart of a travel-pattern estimation process included in a fuel-consumption estimation process.
Figure 12:
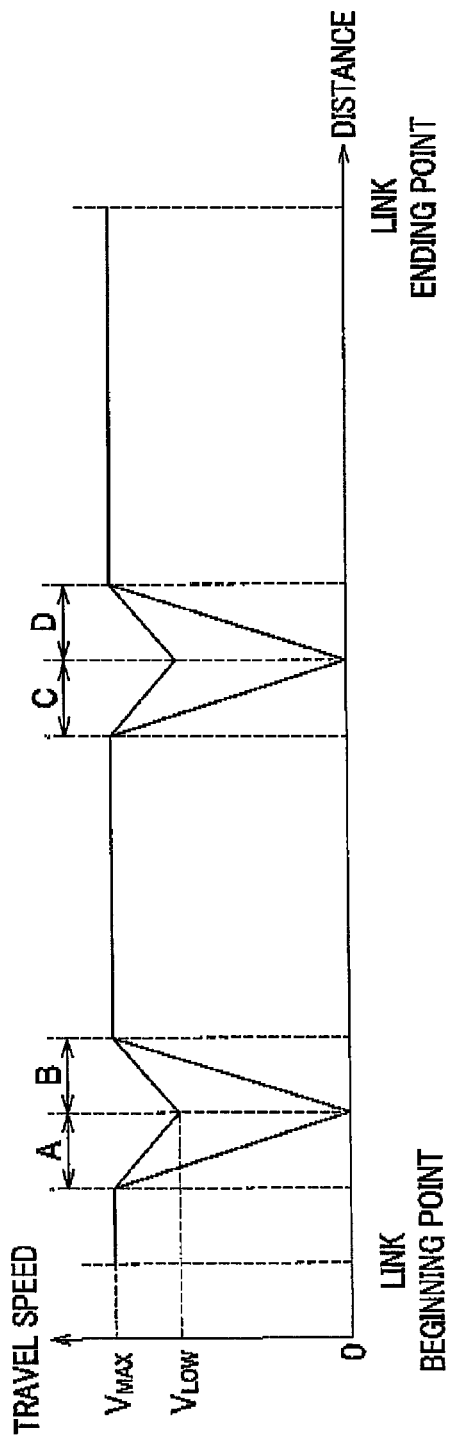
FIG. 12 shows an example of travelling pattern of a vehicle travelling a road link.
Figure 13:
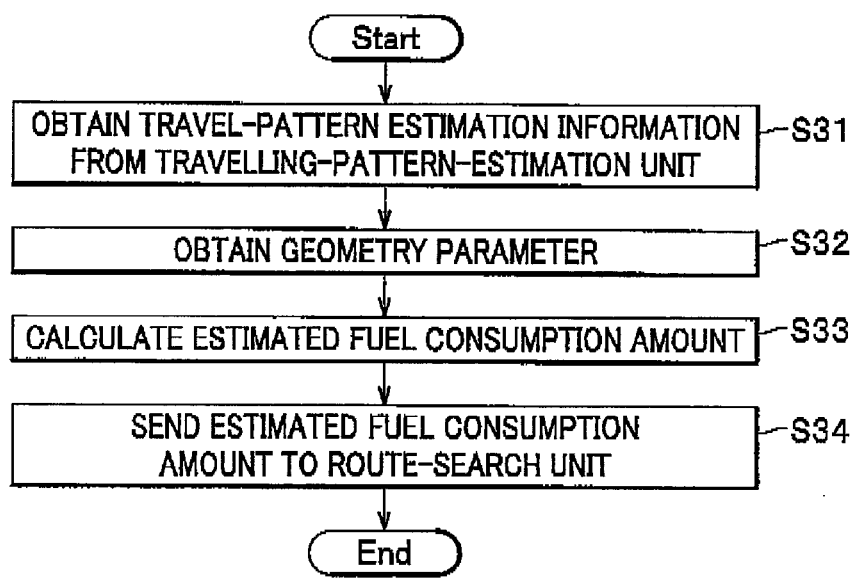
FIG. 13 shows an example of flowchart of a fuel-consumption calculation process included in a fuel-consumption estimation process.

FIG. 10 shows an example of records indicative of statistically-stored traffic information stored in the storage section 217. FIG. 11 shows a flowchart of a travel-pattern-estimation process included in the fuel-consumption estimation process. FIG. 12 shows an example of travelling pattern of the vehicle travelling a road link. FIG. 13 shows an example of flowchart of a fuel-consumption calculation process included in a fuel-consumption estimation process.

The storage section 217 stores the statistically-stored traffic information by tabulating data regarding travelling time obtained for each road link in the past and sorting them on day type basis (e.g. regarding weekday or holiday etc.) or time frame basis as shown in FIG. 10. The following explanation is based on assumption that, the storage section 217 receives data regarding the statistically-stored traffic information externally by using media drive unit 26 for reading out the data or by using the communication device 27; and stores the data in the storage unit 217.

When the driver inputs instruction for searching a fuel-efficient route into the input device 25, the CPU of the navigation-processing device 21 estimates a link-travelling time of the day type and the time frame designated by the instruction based on the statistically-stored traffic information stored in the storage section 217 or based on currently-obtainable traffic information by using the travel-time estimation unit 211. Since various prior arts disclose estimation methods of such kinds in detail, the present specification omits explanation thereof. The simplest method for estimating a link-travelling time may estimate data by directly outputting the link-travelling time included in the statistically-stored traffic information based on day type and time frame designated in a route-search instruction.

After that, the CPU starts a travel-pattern estimation process as shown in FIG. 11 by using a travel-pattern estimation unit 2151. The CPU obtains a link-travel time T estimated by the travel-time estimation unit 211 in step S21, and then, obtains a link length L of the road link from the road map storage unit 218 in step S22.

In step S23, the CPU conducts a congestion estimation process. In the congestion estimation process, the CPU calculates the average speed Va (=L/T) of the vehicle travelling on a current road link based on the link-travel time T obtained in step S21 and the link length L obtained in step S22, and then, the CPU calculates a congestion degree J of the road link based on the average speed Va. As far as a non-expressway is concerned, for example, the congestion degree J can be defined as follows: J=1 when Va≥30 km/h; J=2 when 30 km/h>Va≥10 km/h; and J=3 when 10 km/h>Va. Similarly, as far as an expressway is concerned, the congestion degree J is defined as follows: J=1 when Va≥60 km/h; J=2 when 60 km/h>Va≥40 km/h; and J=3 when 40 km/h>Va.

In step S24, the CPU conducts an acceleration/deceleration estimation process. In the acceleration/deceleration estimation process, the CPU estimates the number N of temporary speed drop of the vehicle on each road link. The number N of temporary speed drop is estimated by using an equation N=T/C where C is a coefficient determined based on road type, and T indicates link-travel time. In general, a vehicle travelling on a non-expressway, which usually has greater number of signal lights, will encounter temporary speed drops more frequently than when travelling on an expressway. Therefore, an inequality of $C_A < C_B$ is effective where $C_A$ is a coefficient for a non-expressway and $C_B$ is a coefficient for an expressway.

The equation N=T/C indicates that temporary speed drops occur more frequently if the link-travel time T becomes longer since speed fluctuation or the number of signal stops will be affected by various link-travel time T. In addition, the equation N=T/C indicates that temporary speed drops occur more frequently in an identical road link if the link-travel time T is longer, i.e., congestion degree increases.

Although, in the present embodiment, the number N of temporary speed drops is estimated in accordance with the link-travel time T, the number N of the estimated temporary speed drops may be corrected in accordance with the number of interpolation points existing in the road link of the three-dimensional road map. More specifically, the number N of the estimated temporary speed drops may be increased or decreased in accordance with the number or density of the interpolation points since temporary speed drops occur more frequently in a road link having folding points, curves, or gradient-changing points indicated by interpolation points.

In step S25, the CPU conducts an acceleration-and-deceleration-distance ratio estimation process. Acceleration-and-deceleration-distance ratio includes a ratio $P_A$ indicating a distance travelled in an acceleration travel mode in a road link, and a ratio $P_D$ indicating a distance travelled in a deceleration travel mode in the identical road link. Therefore, the ratio of distance travelled in a constant-speed travel mode is indicated by $1-P_A-P_D$.

The CPU calculates a congestion degree J of the road link, and sets the maximum speed in the calculated congestion degree J at $V_{MAX}$ as shown in FIG. 12. However, if the road link has a predetermined speed limit, the $V_{MAX}$ is set at lower one of the maximum speed set for the congestion degree J and the predetermined speed limit. For example, an equation congestion degree J=2 is effective if the currently travelling link is a non-expressway, and if an average speed Va is 25 km/h and a speed limit is 50 km/h. The maximum speed in the congestion degree when J=2 is indicated by an equation $V_{MAX}$=30 km/h since the congestion degree when J=2 is 30 km/h as previously explained with regards to the step S23.

Subsequently, the CPU calculates the ratios $P_A$ and $P_D$. The calculation of the ratios $P_A$ and $P_D$ is based on assumptions that: the vehicle drives at the $V_{MAX}$; speed increases from 0 km/h to the $V_{MAX}$ by a constant acceleration rate G; and speed decreases from the $V_{MAX}$ to 0 km/h by the deceleration rate having the same absolute value as that of the constant acceleration rate G. The rate G is assumed to be identical with the acceleration rate G of the temporary speed drop previously explained with reference to FIG. 5 regarding the link shape compression process conducted by the central-processing device 11.

For example, FIG. 12 shows a travelling pattern of a vehicle travelling on a road link in the constant-speed travel mode and repeating temporary speed drops twice by using a diagram in which the vertical axis is travel speed and the horizontal axis is distance from the beginning point of the road link. In this example, the vehicle maintains the same acceleration rate G when accelerating or decelerating in each temporary speed drop. If $L_A$ is designated as distance travelled in one acceleration or in one deceleration as shown in FIG. 12, an equation $L_A$=A=B=C=D is effective, and the distance $L_A$ can be calculated by an equation $$L_A = V_{MAX}^2/2G.$$

The CPU calculates $P_A$ and $P_D$ by using an equation $P_A = P_B = L_A \times N/L$ where $L_A$ is distance travelled in one acceleration of in one deceleration; L is a length of the road link; and N is the time of temporary speed drops estimated in the step S24.

If the vehicle travels on an expressway smoothly, the travelling pattern shown in FIG. 12 in which the vehicle speed drops temporarily from $V_{MAX}$ to 0 km/h and then recovers to $V_{MAX}$ will not occur. However, a travelling pattern similar to that of FIG. 12 will be adaptable to a smooth travelling pattern on an expressway since a phenomenon of speed fluctuation, which commonly occurs on an expressway, may be considered as a kind of temporary speed drop in which the vehicle speed drops temporarily from $V_{MAX}$ to $V_{LOW}$ and then recovers to $V_{MAX}$.

As previously explained, the number N of temporary speed drops, the maximum velocity $V_{MAX}$, and the acceleration-and-deceleration-distance ratios $P_A$ and $P_D$ are calculated by conducting the travel-pattern estimation process as shown in FIG. 11. Hereafter, N, $V_{MAX}$, and $P_A$ and $P_D$ are called as travel-pattern estimation information. In step S26, the travel-pattern estimation information is sent to a fuel-consumption calculation unit 2152 as shown in FIG. 11.

After that, the CPU conducts a fuel-consumption calculation process as shown in FIG. 13 by using the fuel-consumption calculation unit 2152. In step S31, the CPU obtains the travel-pattern estimation information calculated by the travel-pattern estimation unit 2151, and then, the CPU obtains the geometry parameters $M_B$, $M_C$, and $M_D$ of the road link from the geometry parameter storage unit 220 in step S32.

In step S33, the CPU calculates estimated fuel consumption amount Q by using the following Equation 3 including the various vehicle-type parameters of the vehicle selected by the vehicle-type selector 214:

$$Q = F \times T + E \times [W \times \{M_B \times P_A + M_C \times (1-P_A) + M_D\} + E_{AIR} + E_{ACC}] \quad \text{(Equation 3)}$$

W is the vehicle weight included in the vehicle-type parameter selected by the vehicle-type selector 214;
F is fundamental fuel consumption;
E is heat equivalent; and
k is drag coefficient.

A portion of (F×T) in Equation 3 indicates fundamental fuel consumption of the engine. In Equation 3, a portion of ($M_B \times P_A$) indicates friction produced when travelling in the acceleration travel mode and loss of potential energy; a portion of ($M_C \times (1-P_A)$) indicates friction produced when travelling in the constant-speed travel mode loss of potential energy; and a portion of ($+M_D$) indicates friction produced when travelling in the deceleration travel mode and loss of potential energy. In addition, $E_{AIR}$ indicates loss caused by drag (i.e. air resistance), and $E_{ACC}$ indicates acceleration loss caused by kinetic energy produced when the vehicle travels in the acceleration travel mode.

The drag loss $E_{AIR}$ is defined by an equation $E_{AIR} = k \times V_{AVE}^2 \times L$. The acceleration loss $E_{ACC}$ is defined by an equation $E_{ACC} = N \times W \times V_{MAX}^2 / 2$ where $V_{AVE}$ is an average travel speed of the vehicle.

In step S34, the CPU sends the estimated fuel consumption amount Q calculated in the step S33 to the route-search unit 212.

The CPU of the navigation-processing device 21 can obtain the estimated fuel consumption amount Q based on day type, time frame, and road link designated by the driver by conducting the aforementioned travel-pattern estimation process and the fuel-consumption calculation process.

As previously explained, the navigation-processing device 21 obtains the estimated fuel consumption amount Q without using a three-dimensional road map. The navigation-processing device 21 uses the geometry parameters $M_B$, $M_C$, and $M_D$ of each road link in place of the three-dimensional road map. Since the navigation-processing device 21 does not have to maintain the three-dimensional road map, the storage device of the navigation-processing device 21 can save its storage capacity. In addition, the navigation-processing device 21 uses only a few sets of geometry parameters, more specifically, three geometry parameters $M_B$, $M_C$, and $M_D$ for calculating the estimated fuel consumption amount Q for each road link. This means that workload is reduced in the fuel-consumption calculation process, and more specifically, that workload for the CPU of the navigation-processing device 21 is reduced.

Figure 14:
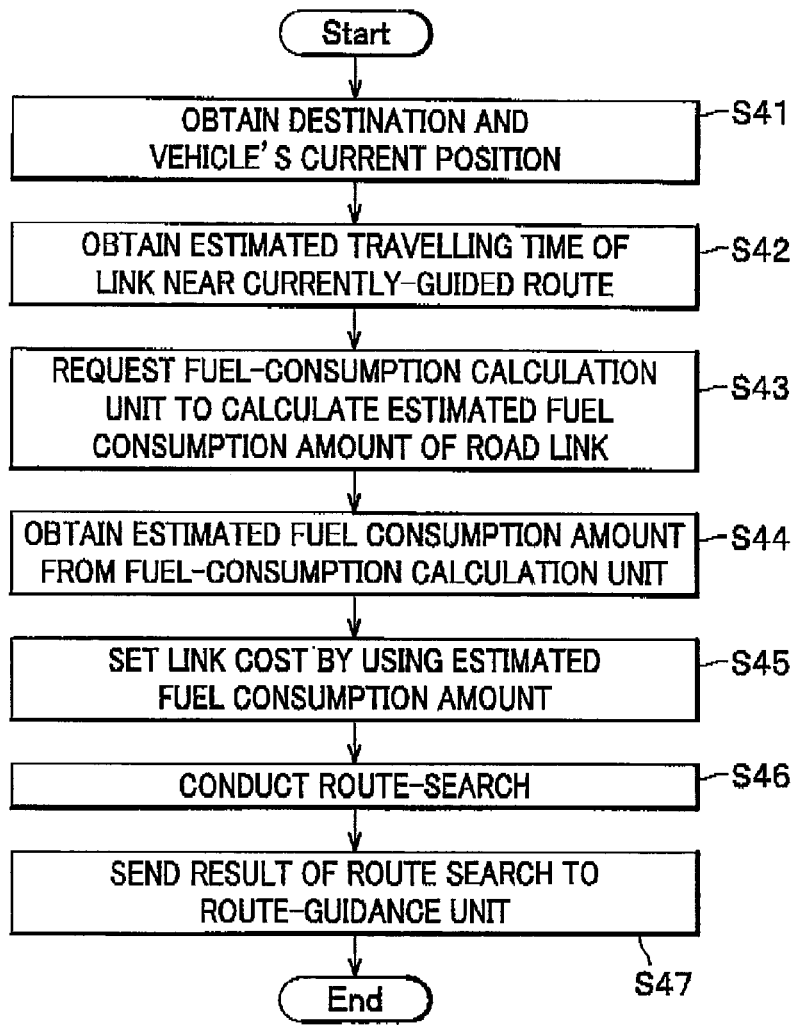
FIG. 14 shows an example of a flowchart of a route-search process.
Figure 15:
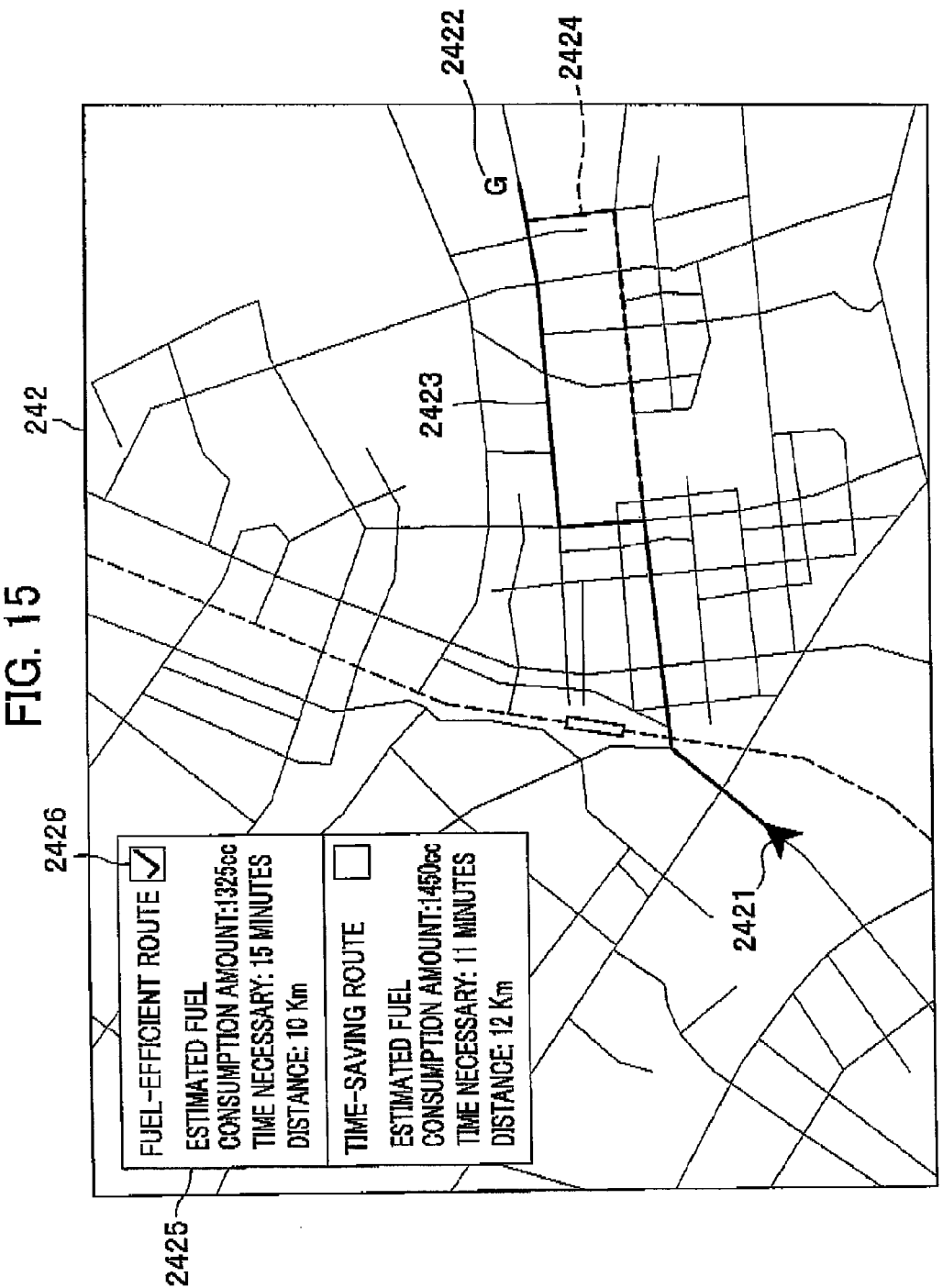
FIG. 15 shows an example of a window displayed on the display unit in a route-guide process.

A route-search process and a route-guide process conducted by the navigation-processing device 21 will be explained with reference to FIGS. 14 and 15. The route-search unit 212 conducts the route-search process, and the route-guidance unit 213 conducts the route-guide process. FIG. 14 shows a flowchart of the route-search process. FIG. 15 shows a window displayed on the display unit in the route-guide process.

The CPU starts the route-search process at various timings, e.g. when the driver puts instruction for searching a fuel-efficient route into the input device 25, or when the CPU recognizes that a currently-guided route must be re-routed. In step S41, the CPU obtains information of a destination and a vehicle's current position from the input device 25 and the GPS receiver 22 etc. In step S42, the CPU uses the travel-time estimation unit 211 and obtains estimated link-travelling time for travelling a road which is in the vicinity of the currently-guided route connecting the vehicle's current position to the destination.

After that, in step S43, the CPU requests the fuel-consumption calculation unit 2152 to calculate the estimated fuel consumption amount Q of the road link of the road in the vicinity of the currently travelling route. In step S44, the CPU obtains the estimated fuel consumption amount Q calculated by the fuel-consumption calculation unit 2152. In step S45, the CPU sets a link cost for use in route search by using the estimated fuel consumption amount Q.

In step S46, the CPU conducts the route-search process based on the link cost having the estimated fuel consumption amount Q. In step S47, the CPU sends the result of route search to the route-guidance unit 213. A commonly known route search algorithm, e.g. Dijkstra's Algorithm can be used for searching a fuel-efficient route.

After that, the CPU conducts the route-guide process by using the route-guidance unit 213, and displays the result of route search on the display unit 24. The display unit 24 may display the fuel-efficient route alone as a guided route in this case. Alternatively, a fuel-efficient route 2423 and a time-saving route 2424, both of which leads the vehicle from a vehicle's current position 2421 to a destination 2422, may be displayed in combination on the guided-route-display window 242 as shown in FIG. 15. This alternative case is based on assumption that the time-saving route is searched in advance in the route-search process conducted by the route-search unit 212.

In order to display the two routes, a display window 2425 may be provided on the guided-route-display window 242 for showing route summary including fuel consumption and necessary travel time for each route. In addition, checkboxes 2426 may be provided for the driver to select the type of route appropriately.

Although the display unit 24 displays the fuel-efficient route and the time-saving route as shown in FIG. 15, the display unit 24 may display a distance-saving route in place of the time-saving route. Alternatively, the display unit 24 may display a plurality of cost-saving routes, searched by using another cost function, together with the time-saving route and the distance-saving route.

In one method of the present embodiment, the navigation-processing device 21 may search a plurality of cost-saving routes including a fuel-efficient route and display the searched routes side by side so that the driver can select a route to be guided as shown in FIG. 15. Alternatively, in another method, the driver may select a cost function for use in route search in advance, and then, the navigation-processing device 21 may search only a cost-function-saving route and displays the result of route search.

Although the geometry parameter storage unit 220 according to the aforementioned embodiment stores the geometry parameters and road maps separately as shown in FIG. 1, the information of road link stored in the road map storage unit 218 may include the geometry parameters. FIG. 16 shows an example of data indicative of road links including information of geometry parameters. As shown in FIG. 16, the data of road links include: ordinary link property data indicating the position and shape of each road link and including a sequence of coordinate points, link connection information, and link property information; and geometry parameters.

The present invention enables high-speed performance since the navigation-processing device 21 in this case does not have to correlate the data stored in the road map storage unit 218 to the data stored in the geometry parameter storage unit 220 in the fuel-consumption estimation process conducted by the fuel-consumption estimation unit 215.

In addition, the present invention can reduce the time for updating data since road map data and geometry parameters stored in a DVD 5 or provided via a communication network 3 are updated simultaneously.

The invention claimed is:

1. A navigation system for searching a route to a destination and guiding a vehicle to the destination, the navigation system comprising:
    a road map data storage unit storing road map data including altitude information;
    an energy variation calculation unit programmed to calculate a variation of mechanical energy of the vehicle travelling on a road link included in the road map data; and
    a route-search unit programmed to search for a fuel-efficient route for the vehicle based on the variation of mechanical energy calculated by the energy variation calculation unit;
    a display unit programmed to display the fuel-efficient route for the vehicle;
    wherein the energy variation calculation unit is further programmed to:
    divide the road link to be used for route-searching into a plurality of sub-links each approximated by a line segment;
    calculate the variation of mechanical energy of the vehicle travelling on the plurality of the sub-links in an acceleration travel mode, a deceleration travel mode, and a constant-speed travel mode, wherein each of the variations of mechanical energy includes a total variation of friction energy based on a length of each sub-link calculated from coordinate information, potential energy based on an altitude difference of both ends of each sub-link calculated by the coordinate information including the altitude information, and kinetic energy;
    categorize the sub-links in accordance with an estimated fuel consumption in each of the acceleration travel mode, the deceleration travel mode, and the constant-speed travel mode into a first category in which the estimated fuel consumption is equal to a minimum fuel consumption of the vehicle in all of the acceleration, deceleration and constant-speed travel modes, a second category in which the estimated fuel consumption is not equal to the minimum fuel consumption in the acceleration travel mode but is equal to the minimum fuel consumption in the deceleration and constant-speed travel modes, a third category in which the estimated fuel consumption is not equal to the minimum fuel consumption in the acceleration and constant-speed travel modes but is equal to the minimum fuel consumption in the deceleration travel mode, or a fourth category in which the estimated fuel consumption is not equal to the minimum fuel consumption in all of the acceleration, deceleration and constant-speed travel modes;
    calculate a sum of the variations, per each categorized sub-link, of mechanical energy that is the total variation of friction energy, potential energy, and kinetic energy of the vehicle travelling on the plurality of sub-links of the road link; and
    render the sum calculated per each categorized sub-link as a geometry parameter of the road link and stores the geometry parameter in a geometry parameter storage unit;
    wherein the route-search unit is programmed to use the geometry parameters in searching for the fuel-efficient route.

2. The navigation system as claimed in claim 1, further comprising:
    a link-travelling time-calculating unit programmed to obtain a link-travelling time of the road link, and
    an input unit programmed to receive vehicle information which indicates a type of the vehicle,
    wherein the energy variation calculation unit is further programmed to:
    obtain the link-travelling time of the road link from the link-travelling time-calculating unit;
    estimate an acceleration-travel pattern, a deceleration-travel pattern, and a constant-speed-travel pattern of the vehicle travelling the road link based on the link-travelling time of the road link obtained by the link-travelling time-calculating unit and length of the road link obtained from the road map data storage unit; and
    estimate fuel consumption of the vehicle travelling the road link based on the estimated travel patterns of the vehicle and the geometry parameter;
    wherein the route-search unit is further programmed to:
    receive vehicle information which indicates the type of the vehicle from the input unit; and
    estimate the fuel consumption of the vehicle, the type of which is inputted into the input unit.

3. A navigation method using a navigation system having a road map data storage unit having road map data including altitude information, the navigation method comprising the steps, carried out by the navigation system for searching a route and guiding a vehicle to a destination, of:
    (a) calculating a variation of mechanical energy of the vehicle travelling on a road link included in the road map data;
    (b) searching for a fuel-efficient route for the vehicle based on the calculated variation of mechanical energy; and
    (c) displaying the fuel-efficient route on a display unit;

wherein step (a) comprises:
(i) dividing the road link to be used for route-searching into a plurality of sub-links each approximated by a line segment;
(ii) calculating the variation of mechanical energy of the vehicle travelling on the plurality of sub-links in each of an acceleration travel mode, a deceleration travel mode, and a constant-speed travel mode, wherein each of the variations of mechanical energy includes a total variation of friction energy based on lengths of the plurality of sub-links calculated from coordinate information, potential energy based on an altitude difference of both ends of each sub-link calculated from the coordinate information including the altitude information, and kinetic energy;
(iii) categorizing the sub-links in accordance with an estimated fuel consumption in each of the acceleration travel mode, the deceleration travel mode, and the constant-speed travel mode into
a first category in which the estimated fuel consumption is equal to a minimum fuel consumption of the vehicle in all of the acceleration, deceleration and constant-speed travel modes,
a second category in which the estimated fuel consumption is not equal to the minimum fuel consumption in the acceleration travel mode, but is equal to the minimum fuel consumption in the deceleration and constant-speed travel modes,
a third category in which the estimated fuel consumption is not equal to the minimum fuel consumption in the acceleration and constant-speed travel modes, but is equal to the minimum fuel consumption in the deceleration travel mode, or
a fourth category in which the estimated fuel consumption is not equal to the minimum fuel consumption in all of the acceleration, deceleration and constant-speed travel modes;
(iv) calculating a sum of the variations, per each categorized sub-link, of mechanical energy that is the total variation of friction energy, potential energy, and kinetic energy of the vehicle travelling the plurality of sub-links of the road link; and
(v) rendering the sum calculated per each categorized sub-link as a geometry parameter of the road link and stores the geometry parameter in a geometry parameter storage unit; and
wherein step (b) comprises:
(i) using the geometry parameters in searching for the fuel-efficient route.

4. The navigation method as claimed in claim 3, further comprising the steps of:
obtaining a link-travelling time of the road link;
estimating an acceleration-travel pattern, a deceleration-travel pattern, and a constant-speed-travel pattern of the vehicle travelling the road link based on the obtained link-travelling time of the road link and length of the road link obtained from the road map data storage unit when searching a route for guiding the vehicle to the destination;
estimating fuel consumption of the vehicle travelling the road link based on the estimated travel patterns of the vehicle and the geometry parameter;
inputting vehicle information which indicates type of the vehicle into an input unit of the navigation system; and
estimating the fuel consumption of the vehicle, of which type is inputted into the input unit, when searching a route for guiding the vehicle to the destination.

5. A navigation system comprising:
a road map data storage unit storing road map data therein;
an energy variation calculation unit programmed to:
calculate the variation of energy of the vehicle travelling on each road link included in the road map data based on the data of the variation of energy according to each travel pattern of the vehicle,
calculate a sum of the variations, per each of a plurality of categorized sub-links, of mechanical energy that is the total variation of friction energy, potential energy, and kinetic energy of the vehicle travelling on the plurality of sub-links of the road link, and
render the sum calculated per each categorized sub-link as a geometry parameter of the road link;
a geometry parameter storage unit programmed to store data of variations of energy previously calculated for road links included in the road map data by using altitude information, the data of variations of energy being stored as geometry parameters;
a route-search unit programmed to search for a fuel-efficient route for the vehicle based on the variation of energy calculated by the energy variation calculation unit; and
a display unit programmed to display the fuel-efficient route for the vehicle
wherein the geometry parameter storage unit stores the sum of variations, per each categorized sub-link, of mechanical energy that is a total variation of friction energy, potential energy, and kinetic energy of the vehicle travelling sub-links of the road link as the geometry parameter of the road link, the sub-links being categorized in accordance with an estimated fuel consumption in each of an acceleration travel mode, a deceleration travel mode, and the constant-speed travel mode into:
a first category in which the estimated fuel consumption is equal to a minimum fuel consumption of the vehicle in all of the acceleration, deceleration and constant-speed travel modes,
a second category in which estimated fuel consumption is not equal to the minimum fuel consumption in the acceleration travel mode, but is equal to the minimum fuel consumption in the deceleration and constant-speed travel modes,
a third category in which estimated fuel consumption is not equal to the minimum fuel consumption in the acceleration and constant-speed travel modes, but is equal to the minimum fuel consumption in the deceleration travel mode, or
a fourth category in which estimated fuel consumption is not equal to the minimum fuel consumption in all of the acceleration, deceleration and constant-speed travel modes,
wherein each sub-link is approximated by a line segment.

6. The navigation system as claimed in claim 5, further comprising:
a link-travelling time-calculating unit programmed to obtain a link-travelling time of the road link, and
an input unit programmed to receive vehicle information which indicates a type of the vehicle,
wherein the energy variation calculation unit is further programmed to:
obtain a link-travelling time of the road link from the link-travelling time-calculating unit;
estimate an acceleration-travel pattern, a deceleration-travel pattern, and a constant-speed-travel pattern of the vehicle travelling the road link based on the obtained link-travelling time of the road link and length of the road link obtained from the road map data storage unit; and estimate fuel consumption of the vehicle travelling the road link based on the estimated travel patterns of the vehicle and the geometry parameter wherein the route-search unit is further programmed to:

receive vehicle information which indicates a type of the vehicle from the input unit; and estimate the fuel consumption of the vehicle of which type is inputted into the input unit.

* * * * *